United States Patent [19]
Hirama et al.

[11] Patent Number: 5,318,831
[45] Date of Patent: Jun. 7, 1994

[54] DUST COLLECTING FILTER CLOTH

[75] Inventors: Takafumi Hirama, Ichikawa; Mitsugu Fujihira, Tokyo, both of Japan

[73] Assignee: Ichikawa Woolen Textile Co., Ltd., Tokyo, Japan

[21] Appl. No.: 558,807

[22] Filed: Jul. 27, 1990

[30] Foreign Application Priority Data

Jul. 28, 1989 [JP] Japan .................................. 1-193893

[51] Int. Cl.$^5$ ...................... D04A 1/08; B32B 27/00; B32B 5/06
[52] U.S. Cl. .................................. 428/280; 428/286; 428/288; 428/296; 428/300; 428/302
[58] Field of Search ............... 428/286, 288, 296, 300, 428/302, 280

[56] References Cited

U.S. PATENT DOCUMENTS 4,476,186 10/1984 Kato et al. .......................... 428/290
4,840,838 6/1989 Wyss .................................. 210/505

Primary Examiner—George F. Lesmes
Assistant Examiner—Kathryne E. Shelborne
Attorney, Agent, or Firm—Flynn, Thiel, Boutell & Tanis

[57] ABSTRACT

A filter cloth having a needle felt layer laminated to a nonwoven fabric sheet made of ultrafine fibers. The fibers of the nonwoven fabric sheet have a fineness of 0.2 denier or less and the fabric sheet is formed by the melt blow method. The needle felt layer preferably has a weight of from 150 g/m$^2$ to 900 g/m$^2$, a longitudinal tensile strength of at least 20 kg/5 cm, a transverse tensile strength of at least 20 kg/5 cm and a bursting strength of at least 10 kg/cm$^2$.

8 Claims, 6 Drawing Sheets 3a  2a  1a

7a

4a

DUST COLLECTING FILTER CLOTH

FIELD OF THE INVENTION

The present invention relates to a filter cloth for use, such as a bag filter, in the field of dust collection, which requires, among other things, strength as well as form retention capability. The present invention is especially suited for use as a filter cloth which is capable of collecting fine particles while retaining the strength and flexibility of conventional felt; and furthermore, its mesh is free from clogging and it is superior in shaking dust off while representing stable pressure drop characteristics for a long time. Thus, the present invention is particularly suited for use as filters in vacuum cleaners or air conditioners.

BACKGROUND OF THE INVENTION

Generally, in the field of dust collection by means of bag filters, the filter cloth must be possessed not only of the capability of catching dust, but also high mechanical strength and form retention capability because the cloth must be subjected to a periodical mechanical shaking operation to remove the dust which has accumulated in the cloth so as to reactivate the same.

Thus, most conventional filter cloths in the bag filters are either a woven cloth or felt.

On the other hand, in the field of dust collection by means of bag filters these days, the dust is becoming more and more finer, as exemplified by dye, cement or resin powder, etc. It is becoming more and more difficult to efficiently cope with such fine powder-like dust by means of conventional filter cloths. Namely, as shown in FIGS. 6(a) and 6(b), in a conventional filter cloth 4a, the pores 2a, constituted by the fibers 1a forming a filtering surface 7a, are relatively large, and the fiber fusions 3a, caused by singeing or pressing, occupy relatively large two-dimensional areas. Therefore, conventional filtering mechanisms, which rely upon dust accumulation within the cloth, are prone to clogging and the shaking off of the dust is difficult, which results in higher pressure drop and shorter useful life.

Consequently, the problems associated with the conventional filter cloth are: (a) the pores in the filtering surface are too large to catch fine particles on the filtering surface; and (b) separability (clearing) of dust is inadequate.

In an attempt to improve the above-mentioned dust separability, it has been proposed to treat the filter cloth with a fluorocarbon or silicone resin. The so-treated filter cloth is in fact effective in its early stage of use; however, its durability is rather poor. Thus, it does not provide a satisfactory solution.

By way of another possible solution, it has been proposed, with a view of forming minute pores on the surface, to provide a coating to the filter cloth, the coating being that of a urethane resin or foamed acrylic resin. However, they have a rather low porosity and high pressure drop and result in insufficient performance. In addition, such processing requires higher manufacturing costs.

Furthermore, there is a filter cloth laminated with a membrane on its surface, the membrane being obtained by spreading a PTFE (tetrafluoroethylene resin) film, typically known as "GOATEX" (trade name of Goatex Co.). The thus obtained filter cloth, because of the superior dust separability due to the minute pores and the function of the resin, may be called the best filter cloth at the present time. However, it has a drawback in that its manufacturing cost is very high. Moreover, the anti-wear property of the membrane is rather inferior and it is prone to breakage. Therefore, if recovery of a powder product is intended, it poses a serious problem in that the fragments of the membrane that fall off are mixed with the product.

On the other hand, in use as air filters for automobiles or for air conditioners, a filter cloth comprising a unitary layer of nonwoven fabric formed by the so-called spun bond method or melt blow method, or comprising composite layers of nonwoven fabric formed by the spun bond method and the melt blow method respectively, is widely used. Out of these new types of filter cloth, the nonwoven fabric produced by the melt blow method is formed of much finer fibers as compared with conventional ones, and the pores formed as a result of the entanglement of the fibers are small enough to seize fine particles. However, it is rather difficult to utilize the above-mentioned filter cloth made of nonwoven fabric as a filter cloth for use in bag filters. The reason is that such cloth is not possessed of the strength and form retention capability necessary for withstanding the high dust load as well as the repeated mechanical reactivation operation common in bag filters.

In order to cope with this problem, it is conceivable to laminate a nonwoven fabric produced by the melt blow method to the surface of felt by means of needle punching. However, by so doing, the minute pores formed by the melt blow method are likely to be enlarged by the needle punching, rendering the attempt rather meaningless. Moreover, since the nonwoven fabric formed by the melt blow method is made of ultrafine fibers, it may not be adequately bonded with the felt layer which functions as a base material.

Even if one tries to bond them together using fine, rapidly moving fluids, such as water jet punching in place of needle punching, it is not possible to bond them strongly, and moreover, the fluids tend to leave traces on the surface of the layer made of the ultrafine fibers, making the surface rugged which will adversely affect the separability of dust.

OBJECT OF THE PRESENT INVENTION

In view of the above-mentioned problems, the inventors made a thorough investigation and found that the above discussed problems may be solved by laminating nonwoven fabric made of ultrafine fibers formed by the melt blow method to the surface of needle felt by thermal or chemical means.

In other words, the object of the present invention is to provide a dust collecting filter cloth, which is possessed of adequate strength as well as form retention capability, as bag filters while reducing the clogging of the filter cloth and maintaining a lower pressure drop.

DETAILED DESCRIPTION

Figure 1A:
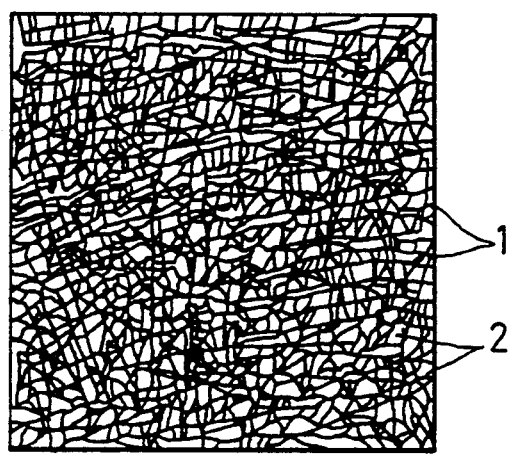
FIG. 1(a) is a plan view of an embodiment of the present invention.

The present invention provides a dust collecting filter cloth comprising a needle felt 4 laminated with a nonwoven fabric sheet 5 made of ultrafine fibers 1, the mean fineness of which is 0.2 denier or less.

A nonwoven fabric 5 made of ultrafine fibers 1, the mean fineness of which is 0.2 denier or less, is formed by the melt blow method. The method used to laminate the nonwoven fabric 5 to the surface of the needle felt 4 is preferably hot roll calendering, but hot plate pressuring is also possible. The nonwoven fabric 5 should preferably have a unitary layer structure as hereafter mentioned so as to be possessed of low pressure drop characteristics comparable to that of PTFE membrane laminated filter cloth.

The mean fineness of the nonwoven sheet 5 of ultrafine fibers should be 0.2 denier or less, and should more preferably be 0.1 denier or less. Here, the reason for the above restriction is that its ability of seizing fine particles is good in that range. The weight of the non-woven fabric sheet 5 should be from 20 $g/m^2$ to 100 $g/m^2$ and should more preferably be from 20 $g/m^2$ to 50 $g/^2$. If the weight is below 20 $g/m^2$, formation of the minute pores 2 will be difficult due to insufficient entanglement of the fibers. Contrarily, if the weight is above 100 $g/^2$, the entanglement will be sufficient, but the form retention as a filter cloth will become inferior, and furthermore, the dust separability will also be inferior. The porosity of the nonwoven fabric sheet 5 should desirably be from 50 percent to 75 percent within which its ability to seize fine particles will be good and the clogging of the mesh will not be serious.

As the material for forming the nonwoven fabric sheet 5, any thermosetting fibers may be used, so long as it is possible to form the nonwoven fabric by means of the melt blow method. By way of showing examples, they include, polyolefin type fibers, such as polypropylene (PP) or polyethylene (PE), polyester type fibers, such as polyethylene terephthalate (PET) or polybutylene terephthalate (PBT), polyamide type fibers, such as nylon 6 or nylon 66, or polyurethane fibers, or polyphenylene sulfide fibers (PPS).

The needle felt 4 forming a base material, may or may not include a ground fabric so long as it is possessed of sufficient strength and form retention capability to be used as a bag filter. By way of showing the above-mentioned "sufficient" strength, its weight should be 150 $g/m^2$ to 900 $g/m^2$, its longitudinal tensile strength should at least be 20 kg/5 cm, its transverse tensile strength should at least be 20 kg/5 cm and its bursting strength should at least be 10 $kg/cm^2$.

The porosity of the needle felt 4 constituting the base material should be equal to or greater than that of the nonwoven fabric sheet 5 forming the surface layer. For that purpose, thick fibers are used as compared with the nonwoven cloth 5. Further considering the layer-to-layer bondability and flexibility, the fiber fineness should desirably be from 0.5 to 10 denier.

Although there is no limitation to the material of the needle felt 4, the material should preferably be possessed of a heat-resistant property that is comparable to that of the nonwoven fabric 5.

Furthermore, in regard to the various, additional conventional treatment given to the needle felt 4, such as resin processing or hardening processing to enable pleat forming or to increase its strength, there should be no limitation, so long as its bondability with the nonwoven fabric does not deteriorate. Therefore, the filtering function of the felt may be utilized substantially "as is". Needless to say, it is possible to functionally improve the filter cloth by resin processing after the lamination has been effected.

Figure 1B:
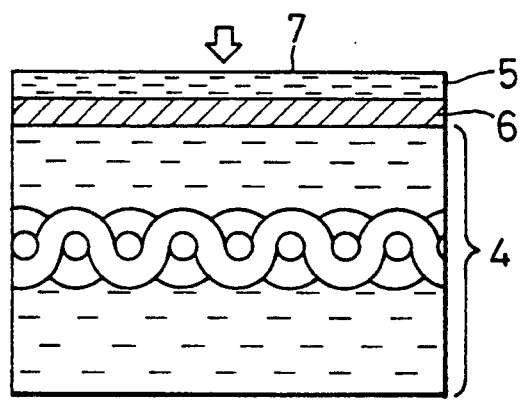
FIG. 1(b) is a section thereof.
Figure 2:
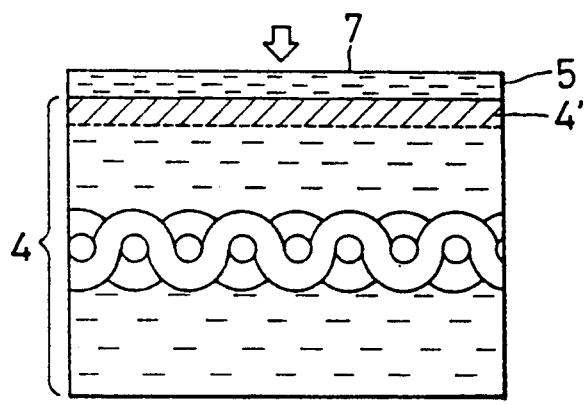
FIG. 2 is a section of a filter cloth according to another embodiment of the present invention.

In order to laminate the nonwoven fabric sheet 5 to the surface of the needle felt 4, thermoplastic or thermosetting adhesives 6 may be employed as shown in FIG. 1(b), or the lamination may be effected by melting the surface 4' of the needle felt 4 as shown in FIG. 2. In effecting the lamination, care should be taken so that the minute surface pores are not clogged and the temperature associated with the bonding will not adversely affect the physical properties of the fibers.

By way of examples, the methods of lamination include spraying hot melt resin/web or thermoplastic/thermosetting resin, or wet lamination by means of textile screen printing, or hot melt lamination after scattering composite fibers including heat-melting components of a low melting point on the felt or sandwiching the web, including such composite fibers, between the felt and the nonwoven fabric.

According to the present invention, dust may be seized substantially on the surface 7 only by means of the minute pores 2 formed as a result of the entanglement of the ultrafine fibers 1 constituting the nonwoven fabric 5.

Since the difference in the fineness of the felt and the nonwoven fabric is large, the nature of the pores is completely different from each other, even if the porosity (or the density if the material is the same) is the same after the lamination.

The strength and form retention capability required as a filter cloth in bag filters may be provided by the needle felt functioning as the base fabric.

EXAMPLES

Hereinafter, examples of the present invention will be described.

EXAMPLE 1

On the surface of PET needle felt (weight: 450 $g/m^2$; mean fineness: 3 denier; and porosity: 78.3 percent or apparent density $\rho' = 0.30$ $g/cm^3$), hot melt mesh (PET type having a weight of 30 $g/m^2$) was deposited as a binder, and thereafter, a nonwoven fabric (PET type having a mean fineness of 0.09 denier and a weight of 30 $g/m^2$) obtained by the melt blow method was laminated thereon.

A hot roll calender was employed for the purpose of the lamination operation.

Physical properties of the thus obtained filter cloth are shown in Table 1.

Figure 3B:
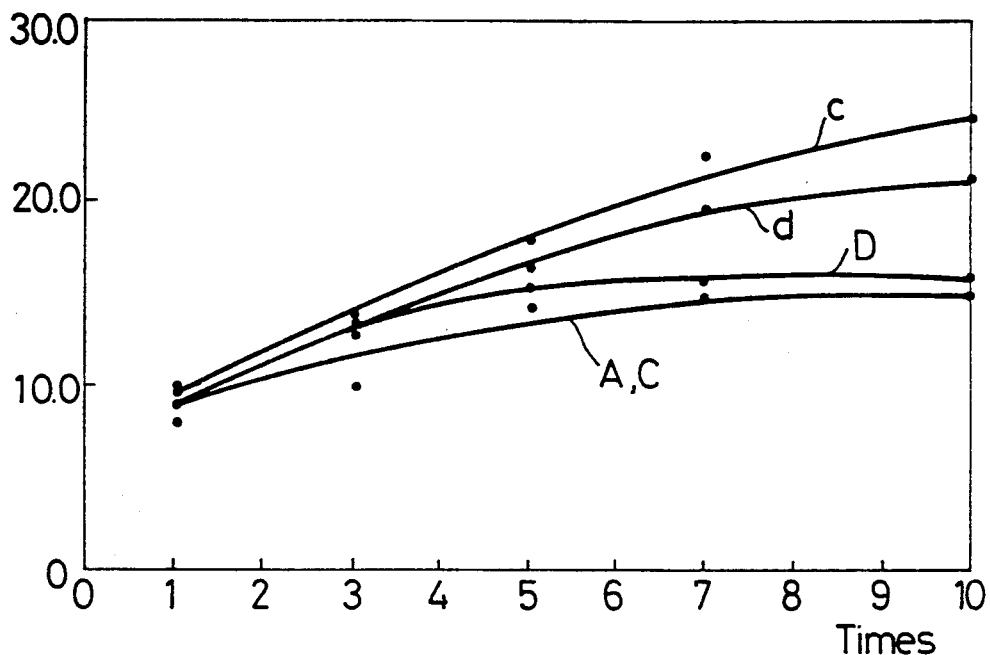
FIGS. 3 through 5 show the test results in change in pressure drop of the filter cloths in which (a) illustrates the change in pressure drop after shaking dust off and (b) shows the change in the rate of residual dust.
Figure 3A:
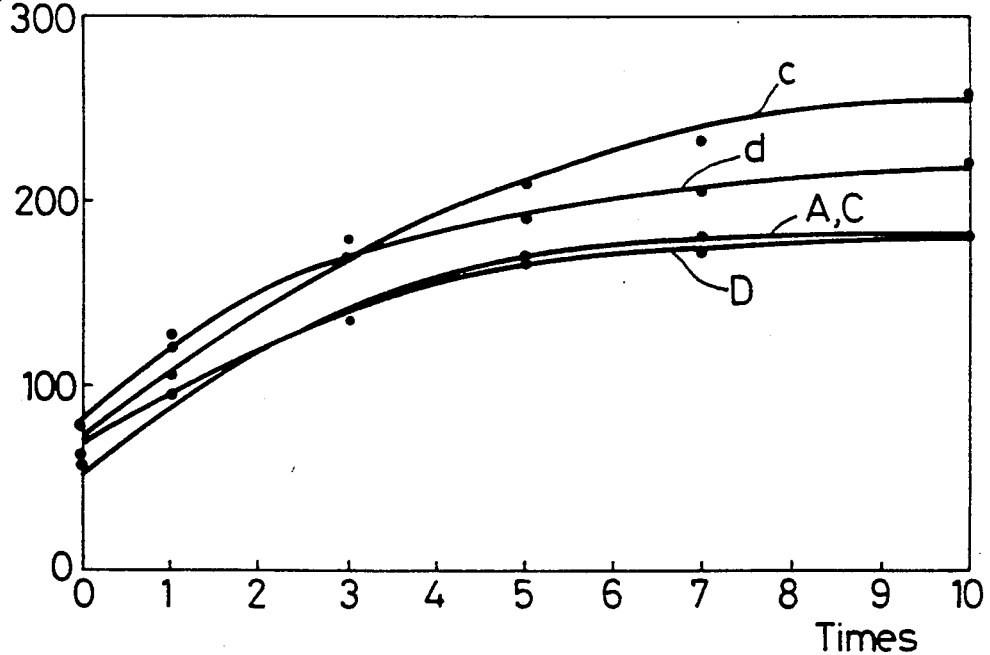

The filter cloth utilized as a bag filter exhibited adequate strength and form retention capability, and the degree of clogging remarkably decreased thereby showing a lower pressure drop (see FIG. 3).

EXAMPLE 2

On the surface of needle felt identical to that of Example 1, thermoplastic urethane web (weight: 30 $g/m^2$) was put as a binder, and thereafter, a nonwoven fabric (PET type having a mean fineness of 0.1 denier and a weight of 20 $g/m^2$) obtained by the melt blow method was laminated utilizing a hot roll calender.

Physical properties of the thus obtained filter cloth are shown in Table 1.

EXAMPLE 3

Needle felt (weight: 200 g/m²; mean fineness: 2.5 denier; and porosity: 80.0 percent or apparent density $\rho'=0.28$ g/cm³) was first made. On the surface thereof, heat meltable fibers (trade name: Unitica Melty, manufactured by Unitica Co. with PET type core; sheath composite type having a sheath melting temperature of 130° C. was mixed so as to be used as a binder.

On the surface thereof, a nonwoven fabric (Polyamide type having mean fineness of 0.07 denier and a weight of 50 g/m²) obtained by the melt blow method was laminated utilizing a hot roll calender.

Physical properties of the thus obtained filter cloth are shown in Table 1.

EXAMPLE 4

On the surface of a Cornex (Teijin Ltd.) needle felt (weight: 400 g/m²; mean fineness: 3.5 denier; and porosity: 73.7 percent or apparent density $\rho'=0.30$ g/cm³) was applied to a urethane resin by the screen textile printing method and thereafter, a nonwoven fabric (PPS type having a mean fineness of 0.09 denier and a weight of 100 g/m²) obtained by melt blow method was wet-laminated and thereafter, heat treatment was carried out for one minute at 150° C. to cure the resin.

The thus obtained filter cloth exhibited an excellent surface smoothness and had the physical properties shown in Table 1.

COMPARATIVE EXAMPLES 1 AND 2

Utilizing the same needle felt, binder and nonwoven fabric sheet as in Example 1, but changing the conditions of lamination, filter cloths having the properties shown in Table 1 were obtained.

The thus obtained cloths had higher pressure drops and higher degrees of clogging and thus were unsatisfactory as low pressure drop filter cloths.

COMPARATIVE EXAMPLE 3

Using the same needle felt and binder as in Example 1, a nonwoven fabric (PET type having a mean fineness of 0.1 denier and a weight of 10 g/m²) obtained by melt blow method was laminated thereto.

The nonwoven fabric on the surface of the thus obtained filter cloth was too thin to seize dust on its surface and, thus, its pressure drop was rather large and unsatisfactory.

COMPARATIVE EXAMPLE 4

On the surface of a PET needle felt (weight: 200 g/m²; mean fineness: 3 denier; and porosity: 74.0 percent or apparent density $\rho'=0.36$ g/cm³), hot melt mesh (same as the Example 1) was put as a binder, and thereafter a non-woven fabric (PET type having a mean fineness of 0.1 denier and a weight of 150 g/m²) obtained by melt blow method was laminated thereto.

The nonwoven fabric sheet of the thus obtained filter cloth was too thick, and thus the shaking off of dust was not efficiently effected. Also, its durability was also not good as fluff, etc., was formed.

COMPARATIVE EXAMPLE 3

On the surface of a PET needle felt (weight: 200 g/m²; mean fineness: 3 denier; and porosity: 74.0 percent or apparent density $\rho'=0.36$ g/cm³), thermoplastic urethane web (same as in Example 2) was deposited as a binder, and thereafter, a nonwoven fabric (PET type having a mean fineness of 0.3 denier and a weight of 20 g/m²) obtained by melt blow method was laminated thereto.

In the thus obtained filter cloth, the pores were not small enough to prevent dust from penetrating into the filter cloth.

TABLE 1

| Samples | | Weight g/m² | Fineness denier | Porosity % | Pore Size μm | Tensile Strength kgf/5 cm Longitudinal | Transverse | Bursting Strength kgf/cm² | Permeability cc/cm²s |
|---|---|---|---|---|---|---|---|---|---|
| Example 1 | Surface Layer | 30 | 0.09 | 71.0 | 4.0 | | | | |
| | Base Layer | 450 | 3.0 | 78.3 | 29.6 | 92.0 | 155.5 | 38.0 | 8.7 |
| Example 2 | Surface Layer | 20 | 0.1 | 64.2 | 3.5 | | | | |
| | Base Layer | 450 | 3.0 | 78.3 | 29.6 | 90.5 | 144.5 | 38.0 | 6.1 |
| Example 3 | Surface Layer | 50 | 0.07 | 69.3 | 3.7 | | | | |
| | Base Layer | 200 | 2.5 | 80.0 | 28.5 | 45.0 | 60.5 | 20.3 | 6.0 |
| Example 4 | Surface Layer | 100 | 0.09 | 72.1 | 4.2 | | | | |
| | Base Layer | 400 | 3.5 | 73.3 | 30.0 | 80.0 | 138.0 | 31.0 | 7.0 |
| Comp. Ex. 1 | Surface Layer | 30 | 0.09 | 42.0 | 2.0 | | | | |
| | Base Layer | 450 | 3.0 | 74.0 | 25.5 | 92.5 | 160.5 | 39.5 | 2.7 |
| Comp. Ex. 2 | Surface Layer | 30 | 0.09 | 80.0 | 5.4 | | | | |
| | Base Layer | 450 | 3.0 | 78.0 | 29.6 | 88.5 | 150.0 | 38.5 | 8.0 |
| Comp. Ex. 3 | Surface Layer | 10 | 0.1 | 70.5 | 4.2 | | | | |
| | Base Layer | 450 | 3.0 | 78.5 | 29.6 | 92.5 | 152.0 | 37.5 | 7.5 |
| Comp. Ex. 4 | Surface | 150 | 0.1 | 53.5 | 2.6 | | | | |

TABLE 1-continued

| Samples | | Weight g/m² | Fineness denier | Porosity % | Pore Size μm | Tensile Strength kgf/5 cm | | Bursting Strength kgf/cm² | Permeability cc/cm²s |
|---|---|---|---|---|---|---|---|---|---|
| | | | | | | Longitudinal | Transverse | | |
| | Layer Base Layer | 200 | 3.0 | 74.0 | 25.5 | 46.3 | 62.0 | 21.0 | 5.8 |
| Comp. Ex. 5 | Surface Layer | 30 | 0.3 | 75.0 | 8.4 | | | | |
| | Base Layer | 400 | 2.5 | 78.0 | 27.0 | 76.8 | 115.0 | 29.8 | 7.0 |

TABLE 2

| | Taber Abrasion Test Method Results: | | | |
|---|---|---|---|---|
| | 500 times | | 2000 times | |
| | Grade | Remarks | Grade | Remarks |
| Example 1 | 3 | Breakage occurred at a few points | 2 | 50% of abrasion portion worn out. |
| PTFE membrane laminated filter cloth | 1 | Membrane damaged; and completely peeled away. | | |

Figure 4B:
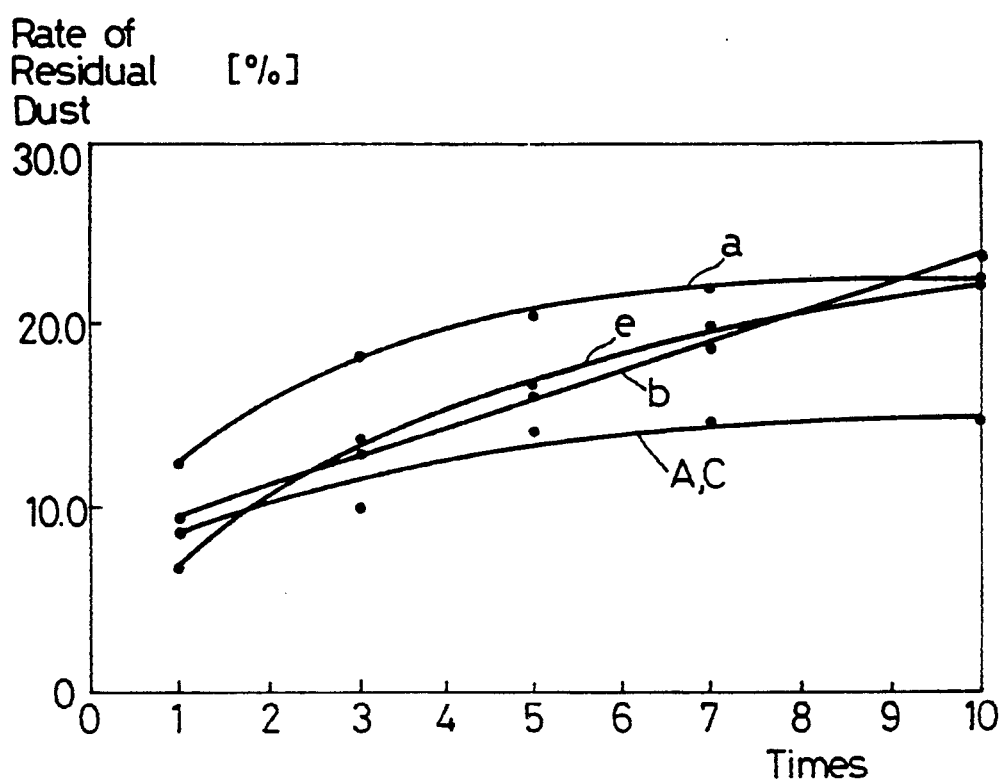
Figure 4A:
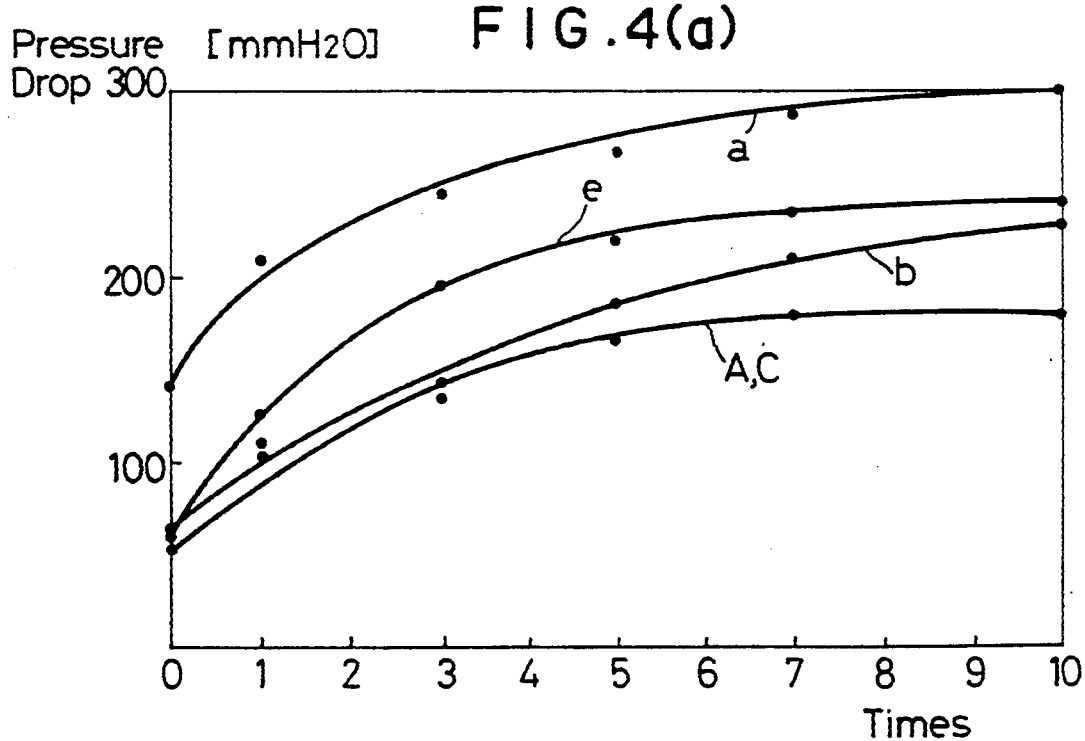
Figure 5B:
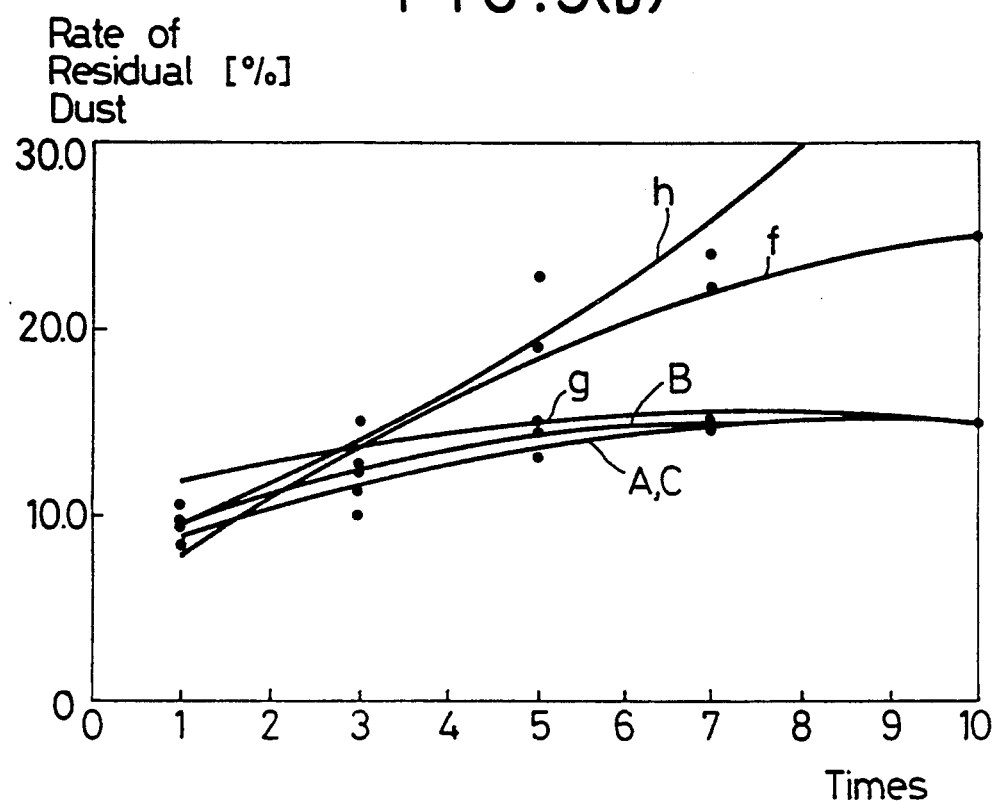
Figure 5A:
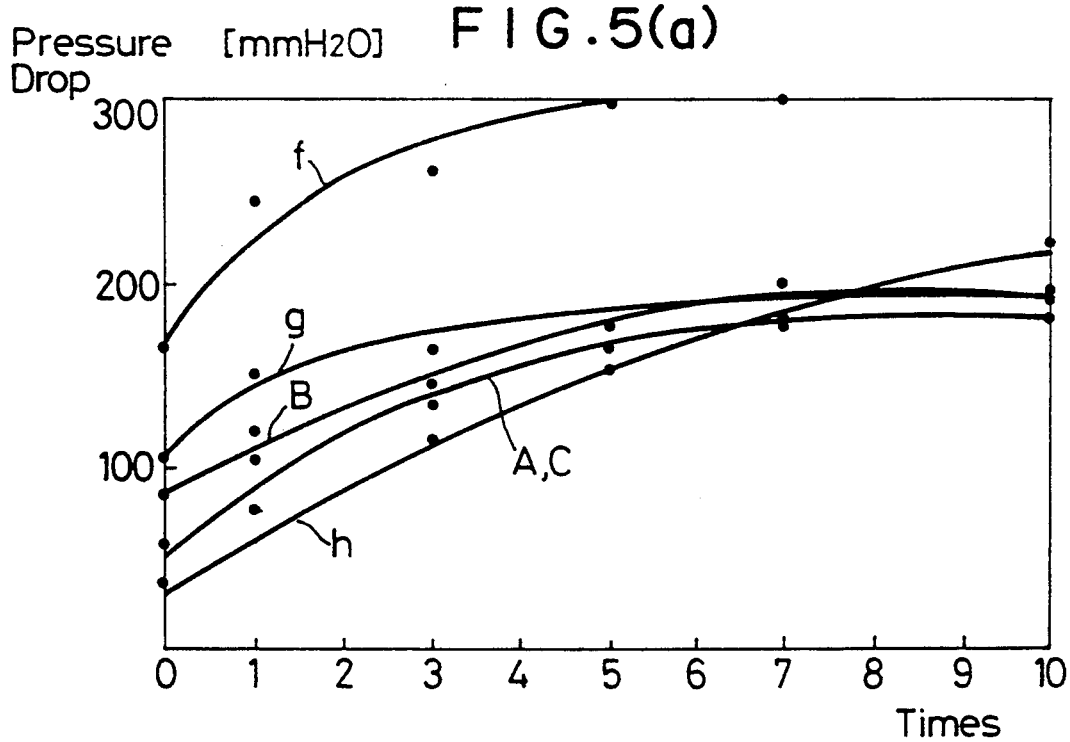
Figure 6A:
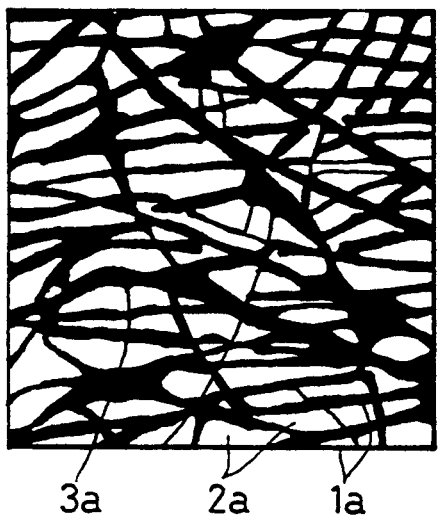
FIG. 6(a) shows a plan view of a conventional filter cloth.
Figure 6B:
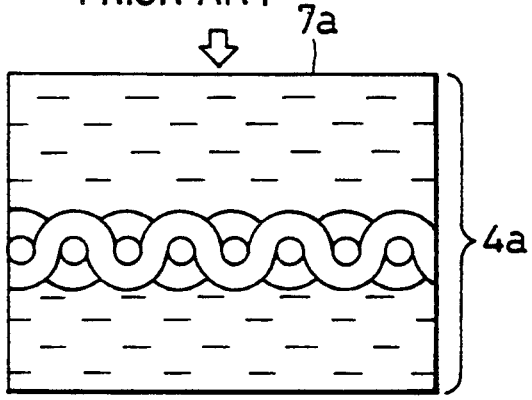
FIG. 6(b) depicts a section thereof.

Notes:
Test Method: Taber Abrasion Test Method (JIS-1096 Basis)
Conditions: Abrasion Wheel CS-10
Load: 500 g(330 g/cm)
Number of Revolution 500 times, 2000 times
Appraisal: Visual Appraisal by Microscope
5 ← ... ... ... ... ... ... → 1
No change   Peeling of Surface Membrane FIGS. 3 to 5 show the test results relating to the change in pressure drop and in each figure, (a) shows the change in pressure drop after shaking dust off, and (b) shows the change in rate of residual dust, respectively. The test conditions are as follows:

| Flow Rate: | 95 l/min |
|---|---|
| Flow Rate for Dust Shaking: | 100 l/min pulse 0.5 sec. per one time |
| Filtering Area: | 64 cm² |
| Dust Residual Rate: | $(W_{sf} - W_{sc})/(W_{sf} - W_o) \times 100$ percent | wherein $W_{sf}$ represents weight of filter cloth after filtering dust;

$W_{sc}$ represents weight of filter cloth after shaking off dust; and $W_o$ represents weight of filter cloth before the test. In FIGS. 3 to 5, A is Example 1, B is Example 2, C is Example 3, D is Example 4, a is Comparative Example 1, b is Comparative Example 2, c is Comparative Example 3, d is Comparative Example 4, e is Comparative Example 5, f is a filter cloth, the surface of which is coated with minutely porous resin, g is a filter cloth laminated with a PTFE membrane, and h is a conventional filter cloth with surface singeing only.

As is evident from the foregoing disclosure, according to the present invention the problem of structural weakness because of lack of strength and form retention capability of the nonwoven fabric sheet may be solved by the lamination of the nonwoven fabric sheet on the surface of the needle felt, and it has become possible to use the excellent particle seizing ability of the nonwoven fabric sheet of ultrafine fibers as a filter cloth in bag filters.

Although in the past conventional multilayer filter cloths formed by melt blow method have been inadequate as substantially elongated bag filters which require substantial strength, the filter cloth in accordance with the present invention can meet such requirements.

In addition, due to the lamination of the nonwoven fabric sheet of ultrafine fibers having a fineness of 0.2 denier or less to the surface of needle felt as the base material, the reduction in size of the surface pores as well as increase in surface smoothness has been achieved. Furthermore, the following advantages have been obtained:

(a) When the dust accumulated on the filter cloth is shaken down periodically to prolong its useful life, the pressure drop may be kept relatively low and is stable.

(b) Dust-separability is good and, accordingly, the rate of dust recovery is excellent.

(c) Compared with PTFE membranes, the anti-wear property is better and the manufacturing cost is lower.

Furthermore, when the filter cloth of the present invention is utilized as a filter bag, a dust collecting machine may be made compact, and the filtering efficiency may be increased. In addition, the useful life may be also increased and, thus, the running cost of a dust collecting machine may be lowered. Furthermore, since the anti-wear property of the surface is good, application in the field of recovery of powder product may be positively carried out.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A dust collecting filter cloth comprising a laminate of a needle felt layer and an individually distinct, nonwoven fabric sheet superposed on a surface of said needle felt layer, the lamination of said needle felt layer and said nonwoven fabric sheet having been effected by using a thermoplastic adhesive or a thermosetting adhesive, or by melting the surface of said needle felt layer without using an adhesive, said nonwoven fabric sheet being made of ultrafine fibers having a mean fineness of 0.2 denier or less, said nonwoven fabric sheet having a weight of from 20 g/m² to 100 g/m² and a porosity of from 50 percent to 75 percent, said needle felt layer having a weight of from 150 g/m² to 900 g/m², a longitudinal tensile strength of at least 20 kg/5cm, a transverse tensile strength of at least 20 kg/5cm and a bursting strength of at least 10 kg/cm$^2$, the porosity of said needle felt layer being equal to or greater than the porosity of said nonwoven fabric sheet.

2. The filter cloth according to claim 1 wherein the nonwoven fabric sheet has a unitary layer structure.

3. The filter cloth according to claim 1, wherein there is a separate adhesive layer between said needle felt layer and said nonwoven fabric sheet.

4. A filter cloth for collecting dust, comprising:

a needle felt layer and a nonwoven fabric sheet laminated together with said needle felt layer, said nonwoven fabric sheet having ultrafine fibers with a mean fineness of 0.2 denier or less, said needle felt layer having fibers with a mean fineness of from 0.5 to 10 denier, said fibers of said needle felt layer being physically separate and distinct from said ultrafine fibers, said needle felt layer and said nonwoven fabric sheet being laminated together so that said ultrafine fibers are not entangled with said fibers of said needle felt layer, said nonwoven fabric sheet and said needle felt layer each having pores therein defined between said fibers thereof, said pores of said needle felt layer being significantly larger than said pores of said nonwoven fabric sheet, said nonwoven fabric sheet having a weight of from 20 g/m$^2$ to 100 g/m$^2$ and a porosity of from 50 percent to 75 percent, said needle felt layer having a weight of from 150 g/m$^2$ to 900 g/m$^2$, a longitudinal tensile strength of at least 20 kg/5cm, a transverse tensile strength of at least 20 kg/5cm and a bursting strength of at least 10 kg/cm$^2$, the porosity of said needle felt layer being equal to or greater than the porosity of said nonwoven fabric sheet; and an adhesive bonding layer interposed between said needle felt layer and said nonwoven fabric sheet for bonding them together.

5. The filter cloth according to claim 4, wherein said needle felt layer and said nonwoven fabric sheet have respective porosities which are approximately equal to each other.

6. The filter cloth according to claim 5, wherein said adhesive bonding layer is formed from a thermoplastic adhesive.

7. The filter cloth according to claim 5, wherein said adhesive bonding layer is formed from a thermosetting adhesive.

8. A filter cloth for collecting dust, comprising:

a needle felt layer and a nonwoven fabric sheet laminated together with said needle felt layer, said nonwoven fabric sheet having ultrafine fibers with a mean fineness of 0.2 denier or less, said needle felt layer having fibers which are physically separate and distinct from said ultrafine fibers, said needle felt layer and said nonwoven fabric sheet being laminated together so that said ultrafine fibers remain outside of said needle felt layer, the lamination of said needle felt layer and said nonwoven fabric sheet having been effected by using a thermoplastic adhesive or a thermosetting adhesive, or by melting the surface of said needle felt layer without using an adhesive, said nonwoven fabric sheet being made of ultrafine fibers having a mean fineness of 0.2 denier or less, said nonwoven fabric sheet having a weight of from 20 g/m$^2$ to 100 g/m$^2$ and a porosity of from 50 percent to 75 percent, said needle felt layer having a weight of from 150 g/m$^2$ to 900 g/m$^2$, a longitudinal tensile strength of at least 20 kg/5cm, a transverse tensile strength of at least 20 kg/5cm and a bursting strength of at least 10 kg/cm$^2$, the porosity of said needle felt layer being equal to or greater than the porosity of said nonwoven fabric sheet.

* * * * *